United States Patent [19]
Isberg

[11] 4,294,273
[45] Oct. 13, 1981

[54] FLUID PROPORTIONING DEVICE

[76] Inventor: Gary J. Isberg, P.O. Box 491, Trail, British Columbia, Canada

[21] Appl. No.: 50,024

[22] Filed: Jun. 18, 1979

[51] Int. Cl.$^3$ .............................................. B65D 87/00
[52] U.S. Cl. ...................................... 137/1; 137/572; 33/126.4 R
[58] Field of Search ................................ 73/427, 428; 33/126.4 R, 126.7 R; 220/20.5; 141/9, 104, 100, 363, 364, 2; 137/1, 3, 572, 576

[56] References Cited
U.S. PATENT DOCUMENTS

| | | | |
|---|---|---|---|
| 3,006,314 | 10/1961 | Malec | 33/126.4 R |
| 3,058,353 | 10/1962 | Irwin | 33/126.7 R UX |
| 3,169,322 | 2/1965 | Milo | 33/126.4 R |

FOREIGN PATENT DOCUMENTS

| | | | |
|---|---|---|---|
| 34616 | 10/1905 | Australia | 33/126.4 R |
| 67976 | 4/1893 | Fed. Rep. of Germany | 33/126.4 R |

*Primary Examiner*—Alan Cohan
*Attorney, Agent, or Firm*—Townsend and Townsend

[57] ABSTRACT

A tube used to mix oil and gasoline in a fuel tank has a one way valve in an end opposite a pouring end of the tube. The capacity of the tube is related to the capacity of the tank so that a prescribed gasoline to oil ratio can be achieved when a certain mixing procedure is followed. The method of mixing gasoline and oil using the tube.

2 Claims, 7 Drawing Figures

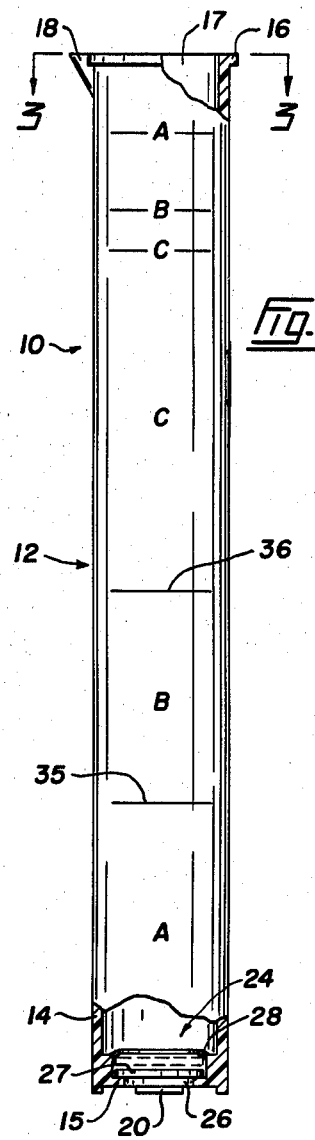
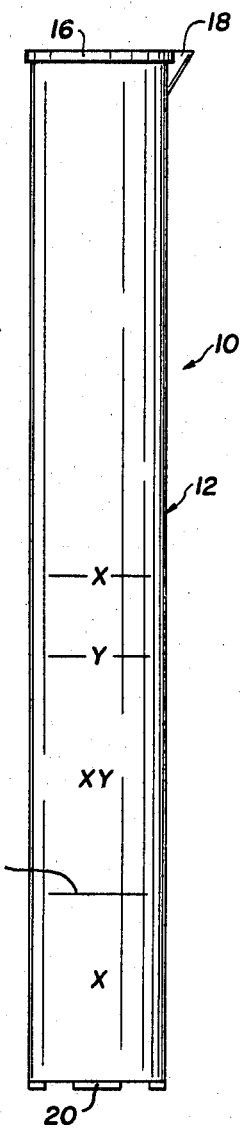
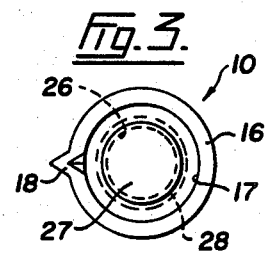
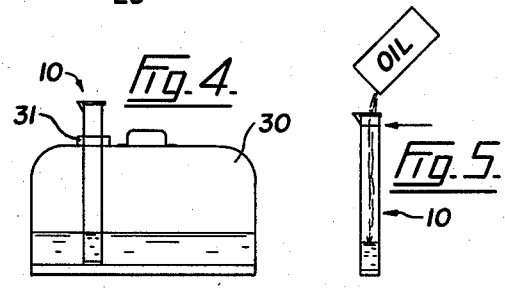
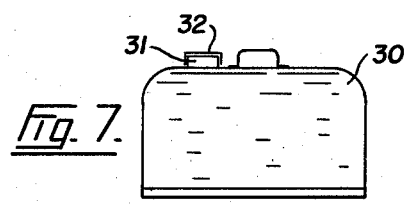

FLUID PROPORTIONING DEVICE

BACKGROUND OF THE INVENTION

This invention relates to a device for mixing a lubricant with gasoline to provide fuel for outboard motors and the like.

DESCRIPTION OF THE PRIOR ART

There are a number of gasoline-powered motors which burn a fuel containing some lubricating oil. Such two-cycle motors are commonly used to power small boats, lawn mowers, chain saws, snowmobiles and the like. The owner of a small boat, for example, usually has an extra container for storing a supply of fuel mixed beforehand to the proportions set down by the engine manufacturer. Such an additional tank adds to the equipment cost involved in operating an outboard motor boat and there is a problem of storing the container aboard the small boat where space often is at a premium.

Some boat operators avoid the need for an additional storage container by attempting to top up the fuel tank by guessing at the proportions of gasoline and oil. When refilling a partially full fuel tank, the quantity of oil required is unknown. Often the operator simply pours in a quantity of oil which appears to be a reasonable amount before filling the tank with gasoline and the resulting mixture is uncontrolled.

SUMMARY OF THE INVENTION

The present invention, generally speaking, is a measuring tube which can be used to indicate the exact level of fuel which remains in the tank and also to indicate the amount of oil which must be added to the tank to provide the ratio recommended by the manufacturer when the tank is topped up with gasoline. More specifically, a fuel proportioning device for adding a first fluid to a second fluid contained in a tank at a prescribed ratio comprises a tube having a pouring end and an opposite end, said tube having a volumetric capacity directly proportional to the volumetric capacity of the tank and substantially equal to the prescribed ratio, and one-way valve means on the opposite end for admitting the second fluid into the tube when said tube is inserted into the tank to a level equal to the level remaining in said tank whereby the space remaining in the tube is a measure of the quantity of the first fluid needed to achieve the prescribed ratio.

BRIEF DESCRIPTION OF THE DRAWINGS

FIG. 1 is a side elevation of a fuel proportioning device with parts broken away and shown in section, FIG. 2 is a elevation of a side of the device opposite the side illustrated in FIG. 1, FIG. 3 is a plan view of the device, FIG. 4 is a schematic view showing the device being used to measure the quantity of fuel mixture remaining in a fuel tank, FIG. 5 is a schematic view showing oil being added to the device containing a measured quantity of fuel mixture, FIGS. 6 and 7 are schematic views showing sequential steps of the mixture procedure followed to arrive at a prescribed gasoline-oil ratio.

DESCRIPTION OF THE PREFERRED EMBODIMENTS

Referring to FIGS. 1, 2 and 3 of the drawings, the numeral 10 indicates generally a fuel proportioning device constructed in accordance with the present invention. This device comprises a tube 12 which preferably is injection molded using a suitable transparent or translucent plastic material. Tube 12 has a thin, cylindrical, side wall 14 and a bottom wall 15. A thickened rim 16 stiffens an open pouring end 17 of the tube and a spout 18 is molded into this end so that the contents of the tube can readily be discharged. The side wall 14 preferably extends below the bottom wall 15 in the form of four circumferentially spaced feet 20.

In FIG. 1, the tube 12 is shown to be provided with valve means generally indicated at 24. Preferably, the means 24 comprises a concentric inlet opening 26 formed in the bottom wall 15. A circular valve disc 27 is mounted within the tube to use the wall 15 as a seat whereby to open and close the inlet opening 26. Inwardly projecting lugs 28 on the inner surface of the tube 12 limit upward movement of the disc 27, the assembly providing a one-way valve arrangement which will allow fluid to enter the tube through the inlet but will prevent fluid contained in the tube from discharging through the inlet.

The tube 12 is intended for use when filling a tank 30 such as is shown in FIGS. 6, and 7. Such a tank is stored aboard a small boat, for example, in a safe location remote from the two cycle outboard motor which powers the boat and the tank is connected to the fuel pump of the motor by the usual fuel lines. One widely used tank holds a maximum of five Imperial gallons of gasoline, that is, six United States gallons or 22.7 liters. The tank 30 shown in the drawings is assumed to have such a capacity and, in FIG. 7, the tank is shown full at which time the level of liquid is at the lower end of the filler spout 31 which is fitted with a cap 32.

For use with the tank 30, the physical dimensions of the tube 10 are mathematically related to the corresponding dimensions of the tank as follows; the length of the tube is greater than the height of the tank so that the pouring end 17 will project through the spout 31 with the cap 32 removed and when the legs 20 are resting on the bottom of the tank as shown in FIG. 4, and the maximum capacity of the tube is 1/100th of the tank capacity. Assuming that the tank is entirely empty of fuel; if oil equal in volume to that of the tube is added to the tank, and the tank is then filled with gasoline, the resulting mixture will have a ratio of 100 parts of gasoline to 1 part of oil.

One side of the tube is provided with a level mark A located near the rim 16 and it should be assumed that oil is added to the tube at this level to achieve the aforementioned 100 to 1 ratio.

In use, the operator of the boat may decide to top up the tank 30 when the mixture level is as shown in FIGS. 4 and 6. The cap 32 normally fitted to the filler spout 31 is removed and the tube 12 is inserted into the tank through the filler spout so that the legs 20 contact the bottom of the tank as shown in FIG. 4. The valve means 24 operates automatically to admit some of the fuel mixture remaining in the tank into the base of the tube, the liquid naturally finding a common level within the tube and tank. Tube 12 is then removed from the tank and is filled with oil as shown in FIG. 5 to the level mark A. The contents of the tube are then poured into the tank, see FIG. 6, which then contains the required amount of lubricant. When the tank is later topped up with gasoline to the level shown in FIG. 7, the ratio of the gasoline and oil mixture in the tank is the required 100 to 1.

Not all outboard motors are designed to operate on a 100 to 1 mixture and some engine manufactures specify a gasoline to oil ratio of 50 to 1, or even 32 to 1. These ratios can be achieved by repeating the above described mixing procedure a second time in the case of a 50 to 1 ratio, and a third time when a 32 to 1 ratio is required. For example, after the first measure of oil is poured into the tank as shown in FIG. 6, the tube 12 is again placed in the tank as shown in FIG. 4 to measure the new level of liquid in the tank. The FIG. 5 step of the procedure is repeated and this additional measure of oil is poured back into the tank before it is topped up with gasoline. The ratio of gasoline to oil is then 50 to 1. If the steps of measuring the quantity of fuel in the tank (FIG. 6) and adding oil to the tube (FIG. 5) are again repeated before the tank is topped up with gasoline, a ratio of approximately 32 to 1 is achieved.

Some manufacturers also produce their own tanks the dimensions of which may vary slightly from the one described above although the volumetric capacity will remain substantially the same. In order to make the present invention more versatile in this respect, one side of the tube 30 is additionally marked as shown in FIG. 1. Spaced below the level mark A, are level marks B and C, (see FIG. 1). A horizontal level mark 35 is located a selected distance above the bottom wall 15 of the tube so as to indicate a zone designated by the letter A on the tube. Another mark 36 is spaced above the mark 35 to indicate a zone B. Still another zone C extends between the mark 36 and the level mark C.

Thus, it is possible to arrive at a 100 to 1 fuel mixture even when the tank of one manufacture is, for example, of greater height than the tank of another manufacturer although also designed to hold 22.7 liters. The user of the device is instructed as to which zone is related to a particular manufacturers tank. Tube 12 is placed in the tank to extract a quantity of the fuel mixture as previously described. Assuming the liquid level in the tube is in zone A, then oil is added to the level A of the tube. If the level is found to be in zone B, oil is added to mark B. The user may find the level of fuel in the tube to be in zone C whereupon oil is poured into the tube to the level C. The tank is topped up and is shaken well to mix the gasoline and oil which is then proportioned at approximately 100 to 1 regardless of which of the three possible amounts of oil was added to the tank. The fuel-measuring and oil-adding steps can be repeated a second and a third time to provide the 50 to 1 and 32 to 1 ratios respectively.

There is a smaller fuel tank which is widely used and that tank will hold a maximum of 3 U.S. gallons, or 2.5 Imperial gallons, or 11.3 liters. In order to use the present device with a tank of this size, one side of the tube 12 is provided with the markings shown in FIG. 2. These level marks consist of marks X and Y located just below the middle portion of the tube, plus a mark 38 nearer to the bottom wall 15, the latter level mark separating zones designated X and XY.

The boat owner's instructions for using the FIG. 2 markings are as follows;
1. Insert tube into the tank so that is rests on the bottom and allow two seconds to fill before removing.
2. Note level retained in tube and add oil to the contents of the tube to level mark X if the fuel level is in zone X
   or (a) if the level is in zone XY, add oil to level mark X if the tank is one (identified by name) manufacturer's tank,
   or (b) if the level is in zone XY, add oil to level mark Y of the tank is another (identified by name) manufacturer's tank.
3. Pour contents by tube into tank, fill with gasoline, shake and 100 to 1 fuel mixture is ready to use.
4. Repeat steps 1 to 3 if 50 to 1 ratio is required.
5. Repeat steps 1 to 3 a third time if 32 to 1 ratio is required.

From the foregoing, it will be apparent a device is provided which will enable oil and gasoline to be proportioned in a fuel tank not only quickly and easily but an acceptable degree of accuracy so that the motor burns a controlled mixture and operates more effectively as a result.

I claim:

1. A method of proportioning oil and gasoline in a fuel tank comprising the steps of inserting into the partially filled fuel tank a tube having a volumetric capacity related to the volumetric capacity of the fuel tank by a ratio directly proportional to a prescribed ratio for mixing the gasoline and oil, admitting into and retaining within the tube a level of fuel equal to the level remaining in the fuel tank, removing the tube from the tank, adding oil to the tube to fill said tube to a predetermined level, and pouring the contents of the tube into the fuel tank before filling said tank with gasoline.

2. The method as claimed in claim 1, and including the additional steps of reinserting the empty tube into the fuel tank prior to filling said tank with gasoline, removing the tube from the tank, adding more oil to the tube to fill said tube to a predetermined level, and pouring the contents of the tube into the fuel tank to achieve a proportionately larger prescribed ratio.

* * * * *